US009071034B2

(12) United States Patent
Armbruster et al.

(10) Patent No.: US 9,071,034 B2
(45) Date of Patent: Jun. 30, 2015

(54) LASER DEVICE

(75) Inventors: Kevin L. Armbruster, Chicopee, MA (US); Brad D. Gilmartin, Gardner, MA (US); Peter J. Kueckendahl, Bad Oldesloe (DE); Bernard J. Richard, Dudley, MA (US); Daniel J. Ryan, Sycamore, IL (US)

(73) Assignee: ALLTEC ANGEWANDTE LASERLICHT TECHNOLOGIE GMBH, Selmsdorf (DE)

( * ) Notice: Subject to any disclaimer, the term of this patent is extended or adjusted under 35 U.S.C. 154(b) by 0 days.

(21) Appl. No.: 14/342,510

(22) PCT Filed: Jul. 19, 2012

(86) PCT No.: PCT/EP2012/003073
§ 371 (c)(1),
(2), (4) Date: Mar. 3, 2014

(87) PCT Pub. No.: WO2013/034218
PCT Pub. Date: Mar. 14, 2013

(65) Prior Publication Data
US 2014/0233597 A1    Aug. 21, 2014

(30) Foreign Application Priority Data
Sep. 5, 2011  (EP) .................................. 11007189

(51) Int. Cl.
*H01S 3/08*    (2006.01)
*H01S 3/07*    (2006.01)
(Continued)

(52) U.S. Cl.
CPC ............. *H01S 3/08059* (2013.01); *H01S 3/076* (2013.01); *H01S 3/0835* (2013.01);
(Continued)

(58) Field of Classification Search
CPC ......... H01S 3/03; H01S 3/0305; H01S 3/031; H01S 3/0315; H01S 3/032; H01S 3/0323; H01S 3/034; H01S 3/041; H01S 3/097; H01S 3/0835; H01S 3/076; H01S 3/08059
USPC .......................................................... 372/55
See application file for complete search history.

(56) References Cited

U.S. PATENT DOCUMENTS 3,705,999 A    12/1972    Hermann et al.
3,919,663 A    11/1975    Caruolo et al.
(Continued)

FOREIGN PATENT DOCUMENTS

DE    4029187 A1    3/1992
DE    4212390 A1    10/1993
(Continued)

OTHER PUBLICATIONS

International Application No. PCT/EP2012/003073, Preliminary Report on Patentability, Sep. 26, 2013, 14 pages.
(Continued)

*Primary Examiner* — Xinning Niu
(74) *Attorney, Agent, or Firm* — Hoffman Warnick LLC

(57) ABSTRACT

The invention relates to a laser device comprising at least three linear laser gain volumes (12) for a gas to be excited, connecting elements (20) for connecting adjacent laser gain volumes, the laser gain volumes being mechanically coupled to other, and forming a common volumetric space, excitation means (50) for the laser gain volumes for exciting the gas in the laser gain volumes for generating a laser light, mirrors (22) arranged in the connecting elements for reflecting laser light between the laser gain volumes, a totally reflecting rear mirror (44), and a partially reflecting output coupler (42) for coupling out a laser beam. The laser gain volumes are arranged in the shape of an open or closed ring surrounding a free central space (8) between them. The invention also relates to a method for marking an object.

15 Claims, 6 Drawing Sheets

(51) Int. Cl.
*H01S 3/083* (2006.01)
*H01S 3/223* (2006.01)
*H01S 3/038* (2006.01)
*H01S 3/03* (2006.01)
*H01S 3/04* (2006.01)
*H01S 3/041* (2006.01)

(52) U.S. Cl.
CPC ............ *H01S3/2232* (2013.01); *H01S 3/0385* (2013.01); *H01S 3/03* (2013.01); *H01S 3/0407* (2013.01); *H01S 3/041* (2013.01)

(56) References Cited

U.S. PATENT DOCUMENTS

| | | | |
|---|---|---|---|
| 4,131,782 A | 12/1978 | Einstein et al. | |
| 4,189,687 A | 2/1980 | Wieder et al. | |
| 4,376,946 A | 3/1983 | Kaminow et al. | |
| 4,467,334 A | 8/1984 | Anzai | |
| 4,500,998 A | 2/1985 | Kuwabara et al. | |
| 4,652,722 A | 3/1987 | Stone et al. | |
| 4,720,618 A | 1/1988 | Stamer et al. | |
| 4,727,235 A | 2/1988 | Stamer et al. | |
| 4,744,090 A * | 5/1988 | Freiberg | 372/94 |
| 4,907,240 A * | 3/1990 | Klingel | 372/58 |
| 4,912,718 A | 3/1990 | Klingel | |
| 4,991,149 A | 2/1991 | Maccabee | |
| 5,012,259 A | 4/1991 | Hattori et al. | |
| 5,109,149 A | 4/1992 | Leung | |
| 5,115,446 A | 5/1992 | Von Borstel et al. | |
| 5,229,573 A | 7/1993 | Stone et al. | |
| 5,229,574 A | 7/1993 | Stone | |
| 5,268,921 A | 12/1993 | McLellan | |
| 5,337,325 A | 8/1994 | Hwang | |
| 5,339,737 A | 8/1994 | Lewis et al. | |
| 5,431,199 A | 7/1995 | Benjay et al. | |
| 5,572,538 A | 11/1996 | Saitoh et al. | |
| 5,592,504 A | 1/1997 | Cameron | |
| 5,646,907 A | 7/1997 | Maccabee | |
| 5,706,305 A * | 1/1998 | Yamane et al. | 372/82 |
| 5,729,568 A | 3/1998 | Opower et al. | |
| 5,815,523 A | 9/1998 | Morris | |
| 5,982,803 A | 11/1999 | Sukhman et al. | |
| 6,050,486 A | 4/2000 | French et al. | |
| 6,057,871 A | 5/2000 | Peterson | |
| 6,069,843 A | 5/2000 | DiMarzio et al. | |
| 6,122,562 A | 9/2000 | Kinney et al. | |
| 6,141,030 A | 10/2000 | Fujita et al. | |
| 6,229,940 B1 | 5/2001 | Rice et al. | |
| 6,263,007 B1 | 7/2001 | Tang | |
| 6,303,930 B1 | 10/2001 | Hagiwara | |
| 6,370,884 B1 | 4/2002 | Kelada | |
| 6,421,159 B1 | 7/2002 | Sutter et al. | |
| 6,539,045 B1 * | 3/2003 | Von Borstel et al. | 372/81 |
| 6,621,838 B2 | 9/2003 | Naito et al. | |
| 6,856,509 B2 | 2/2005 | Lin | |
| 6,915,654 B2 | 7/2005 | Johnson | |
| 7,346,427 B2 | 3/2008 | Hillam et al. | |
| 7,496,831 B2 | 2/2009 | Dutta et al. | |
| 7,521,651 B2 | 4/2009 | Gross et al. | |
| 7,565,705 B2 | 7/2009 | Elkins et al. | |
| 8,263,898 B2 | 9/2012 | Alber | |
| 2001/0030983 A1 | 10/2001 | Yuri et al. | |
| 2003/0010420 A1 | 1/2003 | Morrow | |
| 2003/0123040 A1 | 7/2003 | Almogy | |
| 2003/0147443 A1 | 8/2003 | Backus et al. | |
| 2005/0056626 A1 | 3/2005 | Gross et al. | |
| 2005/0094697 A1 | 5/2005 | Armier et al. | |
| 2006/0161381 A1 | 7/2006 | Jetter | |
| 2007/0138151 A1 | 6/2007 | Tanaka et al. | |
| 2008/0094636 A1 | 4/2008 | Jin et al. | |
| 2009/0010285 A1 | 1/2009 | Dubois et al. | |
| 2009/0245318 A1 | 10/2009 | Clifford, Jr. | |
| 2009/0323753 A1 | 12/2009 | Gmeiner et al. | |
| 2011/0102537 A1 | 5/2011 | Griffin et al. | |
| 2014/0224778 A1 | 8/2014 | Armbruster et al. | |

FOREIGN PATENT DOCUMENTS

| | | |
|---|---|---|
| DE | 10125447 A1 | 1/2002 |
| EP | 0157546 A2 | 10/1985 |
| EP | 0427229 A3 | 5/1991 |
| EP | 1184946 A1 | 3/2002 |
| GB | 1495477 A | 12/1977 |
| GB | 2211019 A | 6/1989 |
| GB | 2249843 A | 5/1992 |
| GB | 2304641 A | 3/1997 |
| JP | 63094695 A | 4/1988 |
| JP | 5129678 A | 5/1993 |
| JP | 2001276986 A | 10/2001 |
| JP | 2007032869 A | 2/2007 |
| JP | 2007212118 A | 8/2007 |
| JP | 2011156574 A | 8/2011 |
| WO | 0046891 A1 | 8/2000 |
| WO | 0107865 A2 | 2/2001 |
| WO | 0243197 A2 | 5/2002 |

OTHER PUBLICATIONS

International Application No. PCT/EP2012/003072, Preliminary Report on Patentability, Mar. 12, 2014, 7 pages.
International Application No. PCT/EP2012/003071, Preliminary Report on Patentability, Mar. 12, 2014, 5 pages.
International Application No. PCT/EP2012/003070, Preliminary Report on Patentability, Mar. 12, 2014, 7 pages.
International Application No. PCT/EP2012/003069, Preliminary Report on Patentability, Nov. 27, 2013, 32 pages.
International Application No. PCT/EP2012/003068, Preliminary Report on Patentability, Mar. 12, 2014, 5 pages.
International Application No. PCT/EP2012/003067, Preliminary Report on Patentability, Nov. 28, 2013, 19 pages.
International Application No. PCT/EP2012/003066, Preliminary Report on Patentability, Nov. 28, 2013, 19 pages.
International Application No. PCT/EP2012/003065, Preliminary Report on Patentability, Nov. 28, 2013, 21 pages.
International Application No. PCT/EP2012/003064, Preliminary Report on Patentability, Nov. 15, 2013, 18 pages.
International Application No. PCT/EP2012/003063, Preliminary Report on Patentability, Mar. 12, 2014, 5 pages.
International Application No. PCT/EP2012/003062, Preliminary Report on Patentability, Mar. 12, 2014, 6 pages.
International Application No. PCT/EP2012/003061, Preliminary Report on Patentability, Mar. 12, 2014, 6 pages.
International Application No. PCT/EP2012/003073, Search Report and Written Opinion, Dec. 18, 2012, 8 pages.
International Application No. PCT/EP2012/003072, Search Report and Written Opinion, Oct. 8, 2012, 11 pages.
International Application No. PCT/EP2012/003071, Search Report and Written Opinion, Nov. 15, 2012, 9 pages.
International Application No. PCT/EP2012/003070, Search Report and Written Opinion, Oct. 8, 2012, 11 pages.
International Application No. PCT/EP2012/003069, Search Report and Written Opinion, Sep. 27, 2012, 8 pages.
International Application No. PCT/EP2012/003068, Search Report and Written Opinion, Nov. 15, 2012, 8 pages.
International Application No. PCT/EP2012/003067, Search Report and Written Opinion, Nov. 16, 2012, 7 pages.
International Application No. PCT/EP2012/003066, Search Report and Written Opinion, Nov. 15, 2012, 7 pages.
International Application No. PCT/EP2012/003065, Search Report and Written Opinion, Nov. 16, 2012, 7 pages.
International Application No. PCT/EP2012/003064, Search Report and Written Opinion, Nov. 16, 2012, 7 pages.
International Application No. PCT/EP2012/003063, Search Report and Written Opinion, Nov. 15, 2012, 9 pages.
International Application No. PCT/EP2012/003062, Search Report and Written Opinion, Nov. 15, 2012, 10 pages.

(56) References Cited

OTHER PUBLICATIONS

International Application No. PCT/EP2012/003061, Search Report and Written Opinion, Sep. 10, 2012, 9 pages.
U.S. Appl. No. 14/342,510, Office Action dated Aug. 1, 2014.
U.S. Appl. No. 14/342,508, Office Action dated Aug. 14, 2014.
U.S. Appl. No. 14/342,503, Office Action dated Aug. 21, 2014.
U.S. Appl. No. 14/342,487, Office Action dated Aug. 14, 2014.
U.S. Appl. No. 14/342,483, Office Action dated Oct. 2, 2014.
U.S. Appl. No. 14/342,493, Office Action dated Nov. 19, 2014.
U.S. Appl. No. 14/342,508, Final Office Action dated Dec. 10, 2014, 23 pages.
U.S. Appl. No. 14/342,503, Final Office Action dated Dec. 18, 2014, 22 pages.
Final Office Action for U.S. Appl. No. 14/342,487, dated Feb. 2, 2015, 31 pages.
Final Office Action for U.S. Appl. No. 14/342,493, dated Apr. 21, 2015, 25 pages.
Notice of Allowance and Fee(s) Due for U.S. Appl. No. 14/342,503, dated Mar. 17, 2015, 11 pages.
Notice of Allowance and Fee(s) Due for U.S. Appl. No. 14/342,508, dated Apr. 1, 2015, 15 pages.
Notice of Allowance and Fee(s) Due for U.S. Appl. No. 14/342,483, dated Apr. 2, 2015, 26 pages.

\* cited by examiner

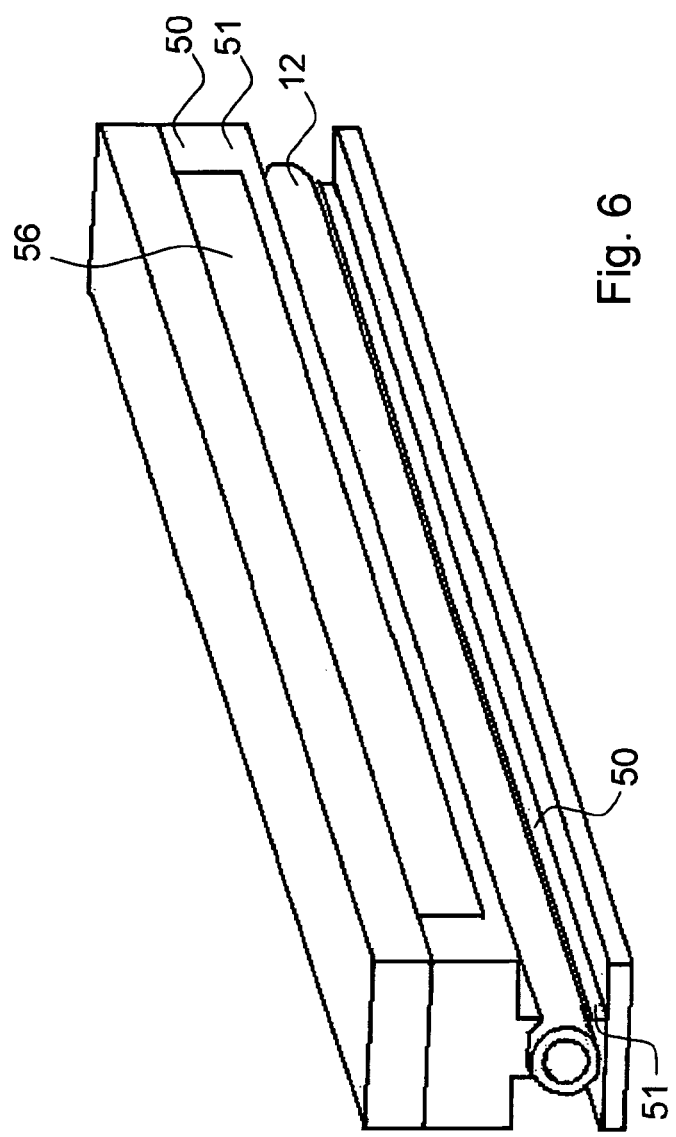

LASER DEVICE

FIELD OF THE INVENTION

The invention refers to a laser device, in particular for marking an object with a laser beam, and to a method for marking an object.

RELATED ART

The output power of a laser device is determined by the length of the gain volume space, in particular the total linear distance of the gain volumes between the output coupler and the rear mirror. This means that as the power requirement increases so does the length of the laser. As the laser power approaches 20 to 30 Watts, the length of a laser device comprising a single laser gain volume becomes impractical for many applications.

Laser developers have used folded tubular spaces, as shown in FIG. 1, to minimize the increase in length at the expense of cross-section. The design approach of these laser developers has been to minimize the cross-section of the laser by squeezing the folds as close together as possible.

However, in many applications, in particular marking applications, where space is at a premium the long but small cross-section laser design results in challenging if not impossible integration problems.

Generally, in such marking applications, the output of the laser device is directed through a scanning device comprising a plurality of mirrors mounted on galvanometers. Such marking systems are limited by the speed of the scanning device relative to the speed of the object passing by the scanning device. The scanning device has insufficient time to write the mark as the object passes. This is a physical limitation of the scanning device.

Another known solution is to create a dot-matrix mark on the object by using an array of individual laser devices to write a column of dots as the object passes in front of the array. This solution achieves a greater marking speed than the scanning device based marking system. A known problem with this solution is, however, that the size of the individual laser devices limits the number of laser devices that can be used in the array such that the number of dots in a character to be printed and the number of lines of code is limited. This is a recognized limitation of the current state-of-the-art in laser marking technology.

US 2005/0094697 A1 discloses a slab or stripline laser comprising a plurality of discharge chambers and folding mirrors disposed between the discharge chambers for coupling laser beams from one discharge chamber into an adjacent discharge chamber. It is known from this document that the discharge chambers may form a square or rectangular discharge path.

DE 40 29 187 A1 describes a $CO_2$-Laser having a laser beam path comprising a plurality of folded beam path segments, wherein the beam path segments are arranged in a triangular or rectangular form. A support structure is provided for at least two beam path segments.

GB 2 211 019 A discloses a gas laser comprising four pipelines arranged in a rectangle.

WO 00/46891 discloses a gas laser comprising a plurality of laser tubes, wherein the laser tubes are arranged in a rectangular shape.

SUMMARY OF THE INVENTION

An object of this invention is to provide a compact laser device that is in particular suitable for marking applications and an economical method for marking an object.

The object is solved according to the invention by a laser device and a method.

The laser device comprises at least three linear laser gain volumes for a gas-to be excited and connecting elements for connecting adjacent laser gain volumes. The laser gain volumes are mechanically coupled to each other and form a common volumetric space. The laser device further comprises excitation means for the laser gain volumes for exciting the gas in the laser gain volumes for generating a laser light, mirrors arranged in the connecting elements for reflecting laser light between the laser gain volumes, a totally reflecting rear mirror, and a partially reflecting output coupler for coupling out a laser beam.

The method for marking an object is carried out with a laser device comprising at least three linear laser gain volumes for a gas to be excited, connecting elements for connecting adjacent laser gain volumes, excitation means for the laser gain volumes for exciting the gas in the laser gain volumes for generating a laser light, mirrors arranged in the connecting elements for reflecting laser light between the laser gain volumes, a totally reflecting rear mirror, and a partially reflecting output coupler for coupling out a laser beam. The laser gain volumes are mechanically coupled to each other and form a common volumetric space.

The laser device according to embodiments of the invention is characterized in that the laser gain volumes are arranged in the shape of an open or closed ring surrounding a free central space between them. It may be preferred according to the invention that the gain volumes be cylindrical or tubular in shape and the term tubes will be used to describe these gain volumes. It is recognized that other gain volume geometries could be used.

An inventive method is characterized in that the laser beam is directed to a free central space surrounded by the laser gain volumes. A scanning device having one or more movable mirrors may be arranged in the free space and direct the laser beam to the object to be marked.

It may be preferred according to the invention that the laser device is a laser device, in particular embodiments a marking head, for marking or engraving an object with a laser beam. The laser gain volumes or resonator tubes of the laser device form a common tubular space, which may also be referred to as a resonator of the laser device. In other words the laser device comprises a resonator including a plurality of resonator tubes which may be mechanically connected with each other. An excitable gas is receivable in the resonator. The gas is excited by means of excitation means in order to generate laser light within the resonator tubes, respectively.

The laser device can be a gas laser and in some particular embodiments a $CO_2$ laser device, wherein the gas in the resonator includes $CO_2$.

The power of the laser device may be determined by the length of the tubular space or resonator, which forms a cavity of the laser device in which laser light is reflected between a rear mirror at one end and a partially reflecting output coupler at the opposite end. By folding the resonator around a free central space, the length of the resonator may be increased without increasing the overall length of the laser device, as compared to a linear resonator. Moreover, the cross-section can be kept small, as the laser tubes are not folded in a zig-zag-pattern, but in a ring-shaped pattern, so that a space within the laser device is clear.

Therefore, one idea of the invention is to provide a free space in the cross-section of the laser device which may be used for example in that an object is received in said free space. According to embodiments of the invention the free space is at least partially surrounded by the laser tubes.

For providing the free space in a centre area of the laser device or marking head, respectively, the resonator tubes are arranged in the form of a circuit or ring which defines the free space. The resonator tubes are straight tubes, that is, they have a longitudinal axis extending along a straight line, and corner areas are formed between adjacent resonator tubes. Therefore, the form of the resonator may also be described as an angled ring, which may either be a closed ring in the form of a loop or an open ring having a spacing between two of the resonator tubes.

According to embodiments of the invention the angle which is formed between each two adjacent resonator tubes is greater than in a typical folded design of the laser tubes, as shown for example in FIG. 1. It may be is preferred that the angle is greater than 60°. This may allow for a better and in particular more effective coupling of the laser light between the resonator tubes. It may also be preferred according to the invention that the angles formed between each two adjacent resonator tubes are equal.

In the corners between the resonator tubes connecting elements are arranged in which mirrors for coupling laser light between the tubes are received. The connecting elements can be corner flanges connected to two adjacent resonator tubes. They may also be called intermediate corner flanges. The connecting elements or connecting flanges may in particular include a ceramic material. In addition, there may be end flanges connected to the resonator tubes at the opposite axial ends of the common tubular space, the end flanges containing the output coupler and a rear mirror, respectively.

In an embodiment of the invention the laser gain volumes are arranged in a triangular, rectangular or square pattern. In a triangular pattern the resonator of the laser device includes three resonator tubes, whereas in the rectangular or square pattern the resonator is made up of four resonator tubes. In other embodiments five or more resonator tubes may be provided and arranged in a polygonal form. The inventive design of the laser device with the ring-like arrangement of the laser tubes allows the geometry of the resonator to be optimized, for example to the power required and the volume limitation of the particular application.

In another embodiment the laser gain volumes are arranged in an open polygonal pattern, in particular a U-pattern. The U-pattern as an embodiment of an open ring or circuit provides easy access to the free central space via the opening in the ring. Therefore, an object may be inserted into the free central space through the clearance between two resonator tubes adjacent to the opening.

In another embodiment of the laser device the laser gain volumes are arranged in one plane. The resonator tubes in a common plane provide a very compact and flat design of a laser device. Moreover, this embodiment allows a plurality of laser devices to be stacked, so that a laser arrangement having a plurality of stacked laser devices may be formed. The stacked arrangement of the flat laser devices provides an array of individual laser devices which permits to create a dot-matrix mark on an object to be marked. Due to the flat shape of the individual laser devices where the resonator tubes are arranged in a circuit in one single plane, the distance between the individual laser beams may be kept small.

A compact laser device, in particular for marking an object, may be achieved in that the laser device is configured to direct the laser beam into the free central space surrounded by the laser gain volumes. To this end a deflecting mirror may be provided which deflects the laser beam passing through the output coupler in the direction of the free central space. This deflecting mirror, which may also be referred to as an output mirror, may be arranged outside the resonator, which is defined at opposite ends by the rear mirror and the output coupler. The output mirror may be movable so that it may deflect the laser beam into different directions and it is also possible to provide more than one output mirror. The one or more movable output mirrors may also be used to direct the beam to another set of one or more movable mirrors called a scanning device.

An advantage of the deflection of the laser beam towards the space enclosed by the resonator tubes is that it is possible to place the scanning device, the gas excitation means, and/or resonator tube cooling means in the enclosed space such that the outer dimensions of the laser device are not increased. To this end, the laser marking device is kept small and can easily be positioned close to the object to be marked. The scanning device may redirect the laser beam through an opening from the inside of the laser device to an outside of the laser device, for marking the object.

For providing the common tubular space it may be preferred according to the invention that at least one of the connecting elements comprises an inner cavity which allows gas to flow between at least two adjacent laser gain volumes connected to the respective connecting element. The inner cavity may have a tubular or pipe-like form with a first axial opening at a first axial end and a second axial opening at a second axial end. The first axial end of the cavity can be connected to a first resonator tube and the second axial end of the cavity can be connected to a second resonator tube. In addition the inner cavity formed in the connecting flange may have a third opening in a corner portion to which a mirror may be attached for reflecting laser light between the resonator tubes.

In another preferred the resonator tubes comprising a laser device are individually sealed such that gas is not permitted to flow between connected laser tubes but that the connecting elements comprise an inner cavity which allows the laser light to be directed between adjacent resonator tubes.

In another embodiment a rear mirror is arranged at a first end of the common tubular space, while the output coupler is arranged at the opposite second end of the common tubular space. The rear mirror, which may also be called an end mirror, may in particular be a totally reflecting mirror while the output coupler may in particular be a partially reflecting mirror. A part of the laser light in the tubular space may be coupled out as the laser beam through the output coupler.

In an embodiment of the invention the laser gain volumes are arranged in a loop and an integrated output flange is provided which is connected between two laser gain volumes, the integrated output flange comprising the output coupler and the rear mirror. The closed loop or ring of the laser device enhances the stability and provides a particularly compact design. The integrated output flange is arranged at a corner between two resonator tubes which may be referred to as end resonator tubes of the common tubular space. The integrated output flange, which may also be referred to as a connecting element, comprises at least two mirrors, namely the rear mirror and the output coupler in the form of a partially reflecting mirror. The integrated output flange may or may not provide a gas connection between the resonator tubes connected thereto. The totally reflecting mirror and the output mirror may in particular be arranged such that the laser light from the two end resonator tubes does not intersect in the integrated corner flange.

In an embodiment the end mirror is provided at a first face of the integrated output flange and the output coupler is provided at a second face of the integrated output flange which may be preferably angled relative to the first face. The first face may in particular be arranged perpendicularly to one of the laser tubes connected to the integrated output flange and the second face may be arranged perpendicularly to the second laser tube connected to the output flange.

It may be preferred that the integrated output flange comprises an output mirror provided at a third face for deflecting the laser beam passing through the output coupler into a predetermined direction. The output mirror, which may in particular be a third mirror in the integrated output flange, may be arranged such that it deflects the laser beam coupled out through the partially reflecting output coupler into the free central space surrounded by the resonator tubes. In a preferred embodiment the output mirror may be provided in a moveable manner on the integrated output flange.

In an embodiment the integrated output flange comprises a first base body to which the end resonator tubes of the resonator are connected. The integrated output flange further comprises a second base body connected to the first base body. A spacing is formed between the first and second base bodies in which is received at least one of the rear mirrors and the output coupler. The rear mirror and/or the output coupler are preferably connected to the first base body in a gas-tight manner and define an axial end of the common tubular space.

The second base body includes a cavity for the laser beam coupled out through the partially reflecting output mirror. The output mirror may be connected to the second base body in a corner portion thereof and deflects the laser beam towards the central free space formed between the resonator tubes of the laser device.

It may be preferred that the tubular space or resonator of the laser device is a closed gas system. This means in particular that the resonator of the laser device is a completely closed cavity and that there is no constant gas flow through the resonator. The gas in the resonator, that is in the common tubular space, is only replaced in certain intervals when the laser device is out of operation. Therefore, no gas inlet and no gas outlet are provided for a constant flow of gas through the tubular space and no space is needed for equipment pumping the gas through the system.

According to embodiments of the invention, a particularly compact and flat design of the laser device may be achieved in that the at least one radio frequency electrode, in particular the RF inductor, has a planar coil design. In the planar coil design the coil of the electrode may in particular be arranged in one single plane. In a preferred embodiment the coil may be arranged in a spiral form.

It may be referred that the excitation means for the resonator tubes include at least two radio frequency electrodes extending along a longitudinal axis of the respective resonator tube. The two radio frequency electrodes may in particular be arranged on opposite sides of the laser tube, for example there may be an upper electrode and a lower electrode, both of which extend along the length of the resonator tube.

BRIEF DESCRIPTION OF THE DRAWINGS

The invention will now be further described with reference to the attached figures, wherein:

FIG. 6 shows a laser tube and electrodes for exciting a gas in the laser tube according to the invention.

In all Figures, identical or corresponding components are identified by identical reference signs.

DETAILED DESCRIPTION OF THE INVENTION

It is known that the excitation means for at least one of the laser gain volumes include at least one electrode, in particular a radio frequency electrode. The electrode may in particular extend along the axial length of the laser tube. It is also known that for reasons of efficiency and for uniform excitation of the gas in the resonator, RF inductors must be connected to the electrode main bodies. For example the RF inductor may have a helical coil design. A known problem with this solution is that the coil design of a RF inductor substantially increases the size of the laser and is costly.

Figure 1:
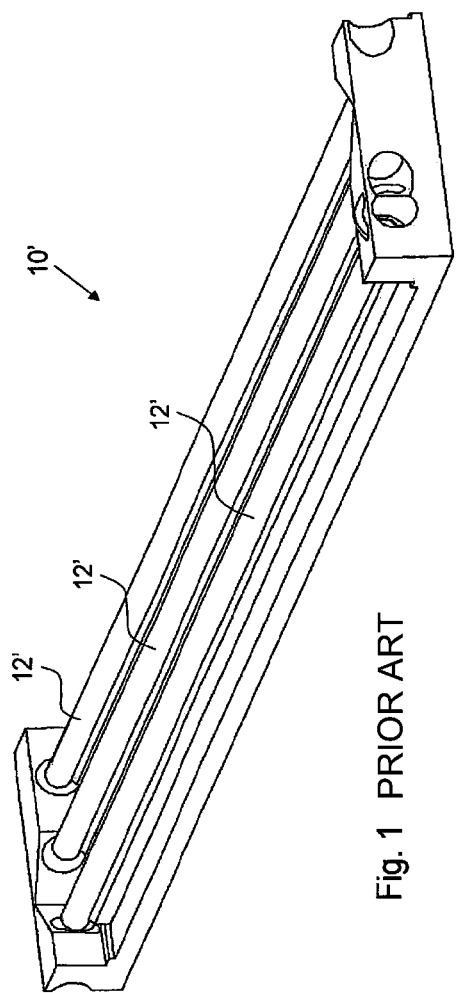
FIG. 1 shows an arrangement of laser tubes of a laser device according to the prior art.

FIG. 1 shows a folded design of laser tubes 12' of a laser device 10' according to the prior art. In this design the laser tubes 12' are arranged close to each other and nearly parallel in order to provide a small cross-section.

Figure 2:
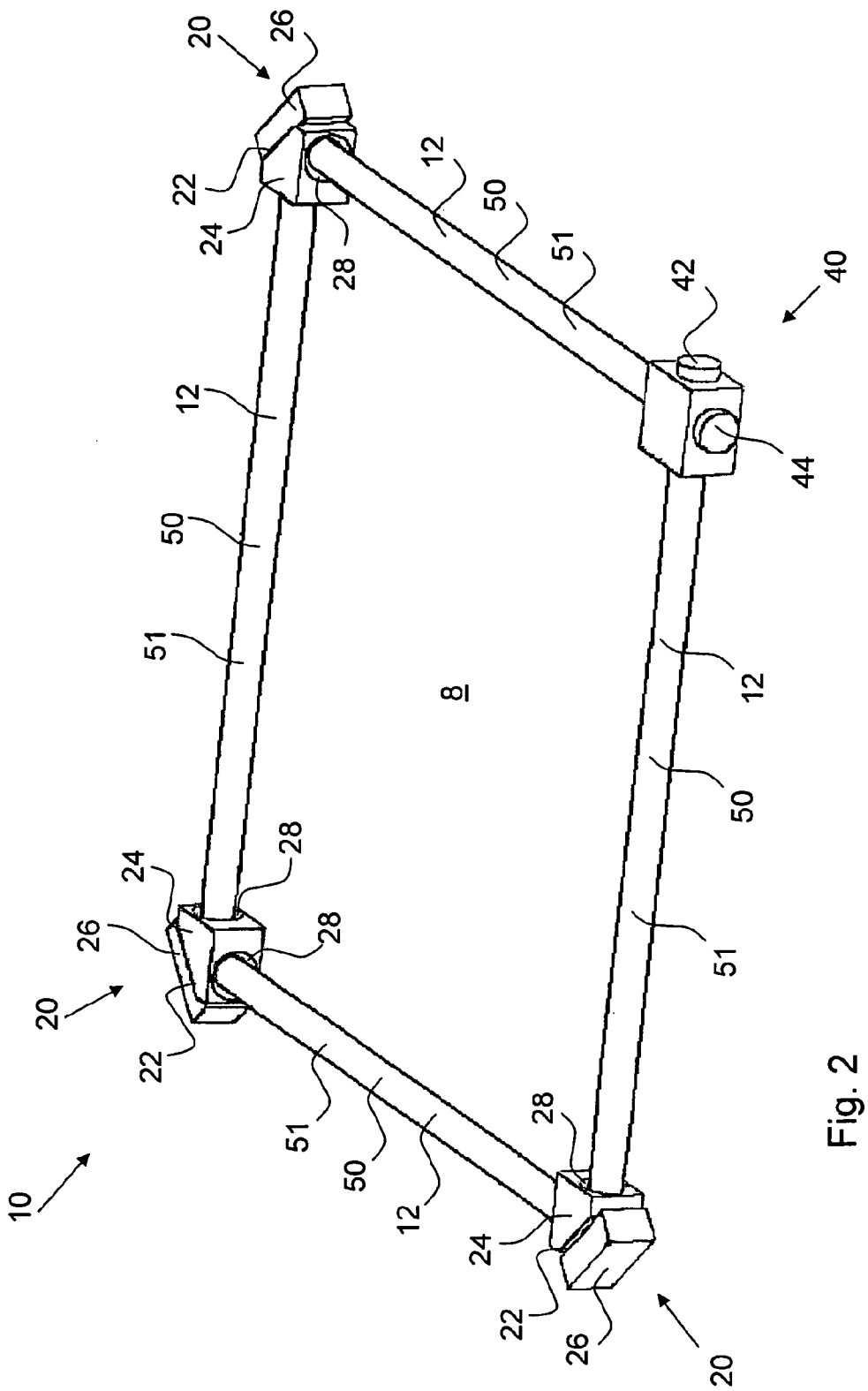
FIG. 2 shows an embodiment of a laser device according to the invention.

An embodiment of an inventive laser device 10 is shown in FIG. 2. The laser device 10 may in particular be a laser device for marking an object by means of a laser beam. One or more of such laser devices 10 may be integrated into a marking head for marking an object.

The laser device 10 comprises a plurality of laser gain volumes or resonator tubes 12 which may in particular be alumina tubes. The resonator tubes 12 form a part of a common tubular space which may be referred to as the resonator of the laser device 10. The resonator tubes 12 are enclosed by radio frequency electrodes 51 for exciting a gas contained in the resonator tubes 12. The electrodes 51 extend substantially along the entire length of the resonator tubes 12.

In the shown embodiment the laser device 10 comprises four resonator tubes 12 which are arranged in a rectangle and form a closed loop. A central free space 8 is formed in an inner area of the laser device 10. The space 8 is surrounded by the resonator tubes 12. Each of the resonator tubes 12 has a longitudinal axis. The longitudinal axes of the resonator tubes 12 extend in one common plane.

The resonator tubes 12 are generally made up of two end resonator tubes and at least one intermediate resonator tube fluidically connected between the end resonator tubes. In the shown embodiment there are two intermediate resonator tubes. Connecting elements 20 or corner flanges are arranged in the corners between the intermediate resonator tubes 12 and between the end resonator tubes and the adjacent intermediate resonator tube.

Each of the connecting elements 20 has a mirror 22 for reflecting laser light from one resonator tube 12 to an adjacent resonator tube 12. The connecting elements 20 have a generally triangular form and comprise a base body 24, to which the laser tubes 12 are connected, and a mounting flange 26 including the mirror 22. The base body 24 includes two inlet portions for connecting the resonator tubes 12. A gas cavity 28 or gas tube is formed in the base body 24 for a fluidic connection between the resonator tubes 12 coupled to the connecting element 20.

At the end of one of the resonator tubes 12 is arranged a rear or end mirror 44 for reflecting the laser light in the resonator tube 12. At the end of second resonator tube 12 is arranged an output coupler 42 for coupling out a laser beam. The output coupler 42 is a partially reflecting mirror.

In the illustrated embodiment two of the resonator tubes 12, the end resonator tubes, are interconnected by an integrated output flange 40. The integrated output flange 40 comprises the output coupler 42 for coupling out the laser beam and the rear mirror 44 at the end of one of the resonator tubes 12 for reflecting the laser light at the opposite end of the resonator. The output coupler 42 and the rear mirror 44 are arranged on outside faces of the output flange 40 and the light in the tubular space intersects at an angle of 90 degrees in the integrated output flange 40.

Figure 3:
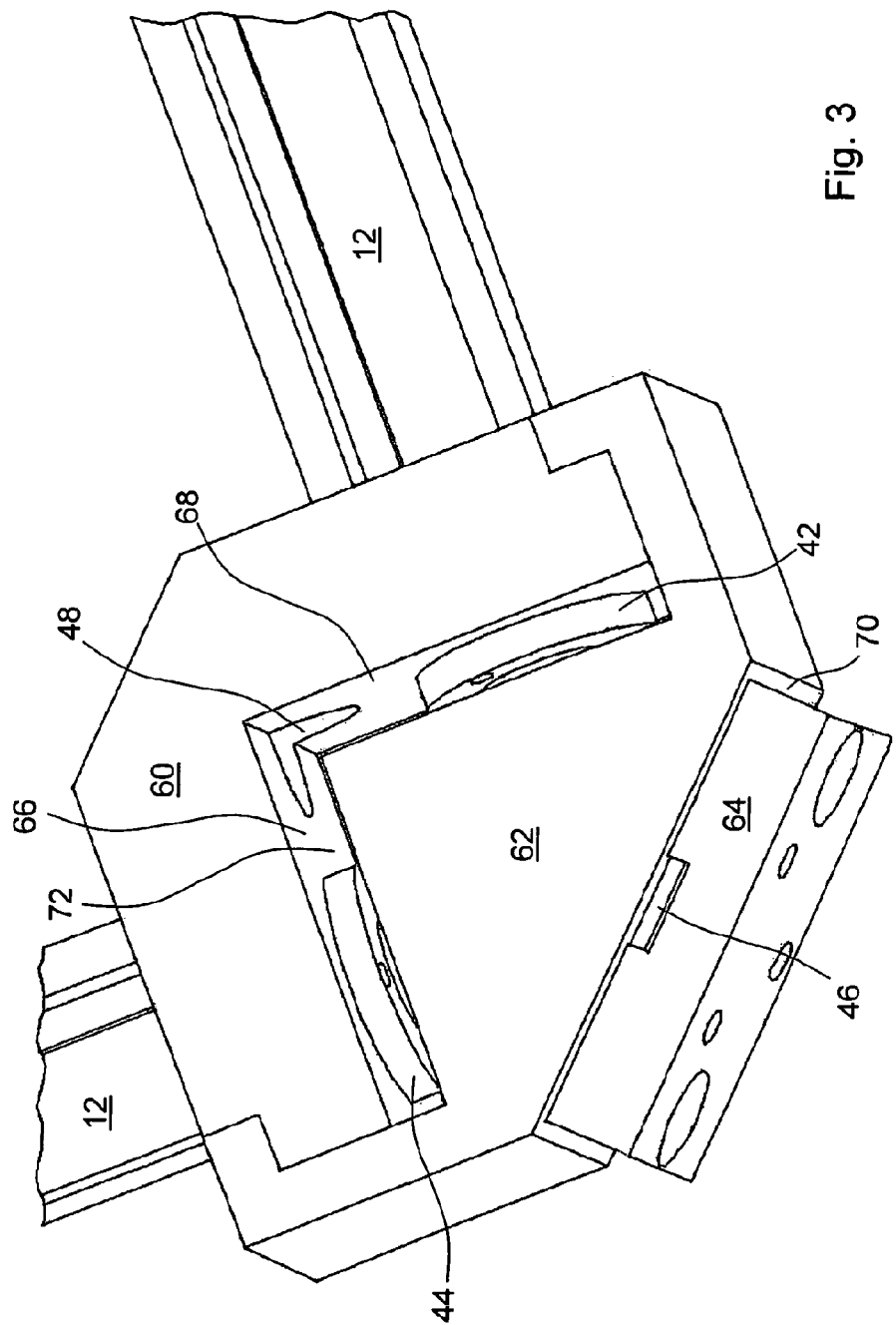
FIG. 3 shows an embodiment of the integrated output flange according to the invention.
Figure 4:
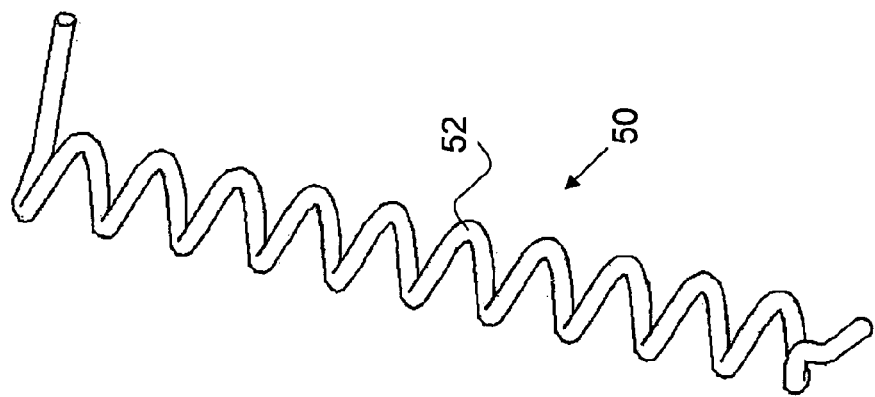
FIG. 4 shows an example of a RF inductor used for tuning a laser device commonly found in the prior art.

A second embodiment of an integrated output flange 40 is shown in FIG. 3. The integrated output flange 40 has two inlet portions for coupling two resonator tubes 12 to the integrated output flange 40.

In a corner area of the integrated output flange 40 an output mirror 46 is provided for reflecting the laser beam coupled out through the output coupler 42 into a predetermined direction. The output mirror 46 is arranged such that the laser beam is reflected into the free central space 8 of the laser device 10.

The integrated output flange 40 comprises a first, inner base body 60 and a second, outer base body 62. An inner cavity or spacing 72 is formed between the first and second base bodies 60, 62 in which are received the rear mirror 44 and the output coupler 42. The end resonator tubes 12 of the resonator are coupled to the first base body 60, while the output mirror 46 for deflecting the laser beam passing from the tubular space through the output coupler 42 is connected to the second base body 62.

The rear mirror 44 is coupled to a first face 66 of the integrated output flange 40, wherein the first face 66 is a face of the first base body 60. The output coupler 42 is coupled to a second face 68 of the integrated output flange 40, wherein the second face 68 is also a face of the first base body 60. The output mirror 46 is mounted to a third face 70 of the integrated output flange 40, wherein the third face 70 is a corner face of the second base body 62. The first and second faces 66, 68 are internal faces of the integrated output flange 40, whereas the third face 70 is an external face. A mounting flange 64 is also connected to the third face 70.

The second base body 62 includes a channel for the laser beam between the partially reflecting output coupler 42 and the output mirror 46. The output mirror 46 deflects the laser beam towards the central free space 8 formed between the resonator tubes 12 of the laser device 10. An output hole 48 is formed in the first base body 60 of the integrated output flange 40 through which the laser beam deflected by the output mirror 46 may pass into the free central space 8. Therefore, the output hole 48 connects the output mirror 46 with the central space 8.

Figure 5:
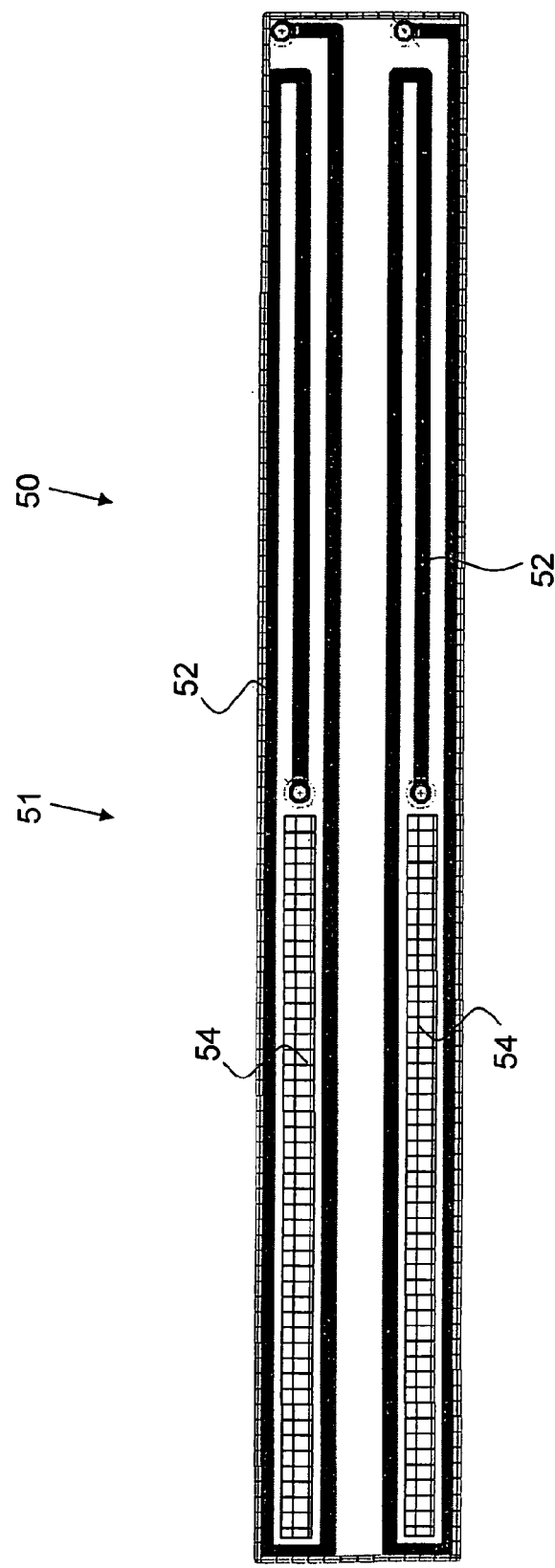
FIG. 5 shows an embodiment of a radio frequency electrode incorporating a planar RF inductor for tuning the laser tube according to the invention.

A first embodiment of an excitation means 50 is shown in FIG. 5. The excitation means 50 is an electrode 51 with a coil 52 that is wound in a helical manner and thus forms a helix.

FIG. 5 shows a planar electrode 51 with a coil 52 arranged in one single plane in a spiral manner. The coil 52 is arranged on a mounting plate 54. As shown in FIG. 5 the electrode 51 may comprise two individual coils 52 arranged on the mounting plate 54.

A resonator tube 12 with an excitation electrode 51 mounted to it is shown in FIG. 6. The electrode 51 extends on a lower side of the resonator tube 12 substantially along its entire length. On an upper side of the resonator tube 12 a second electrode 51 may be arranged. In the shown embodiment a cooling block 56 is arranged on the upper side of the resonator tube 12. The cooling block 56 has cooling channels through which a cooling fluid may circulate for cooling the resonator tube 12.

The invention claimed is:

1. A laser device comprising:
    at least three linear laser gain volumes for a gas to be excited;
    connecting elements for connecting adjacent laser gain volumes, the laser gain volumes being mechanically coupled to each other, and forming a common volumetric space;
    excitation means for the laser gain volumes for exciting the gas in the laser gain volumes for generating a laser light;
    mirrors arranged in the connecting elements for reflecting laser light between the laser gain volumes;
    a totally reflecting rear mirror; and
    a partially reflecting output coupler for coupling out a laser beam,
    wherein the laser gain volumes are arranged in the shape of an open or closed ring surrounding a free central space between them, and
    wherein the laser device is configured to direct the laser beam into the free central space surrounded by the laser gain volumes.

2. The laser device according to claim 1, wherein the laser gain volumes are arranged in a triangular, rectangular or square pattern.

3. The laser device according to claim 1, wherein the laser gain volumes are arranged in a U-pattern.

4. The laser device according to claim 1, wherein the laser gain volumes are arranged in one plane.

5. The laser device according to claim 1, wherein at least one of the connecting elements comprises an inner cavity which allows gas to flow between at least two adjacent laser gain volumes connected to the connecting element.

6. The laser device according to claim 1, wherein the rear mirror is arranged at a first end of the common volumetric space, while the output coupler is arranged at the opposite second end of the common tubular space.

7. The laser device according to claim 1, wherein the laser gain volumes are arranged in a loop, and an integrated output flange is provided which is connected between two laser gain volumes, the integrated output flange comprising the output coupler and the rear mirror.

8. The laser device according to claim 7, wherein the rear mirror is provided at a first face of the integrated output flange and the output coupler is provided at a second face of the integrated output flange.

9. The laser device according to claim 7, wherein the integrated output flange comprises an output mirror provided at a third face for deflecting the laser beam passing through the output coupler into a predetermined direction.

10. The laser device according to claim 1, wherein the volumetric space is a closed gas system.

11. The laser device according to claim 1, wherein the excitation means for at least one of the laser gain volumes include at least one radio frequency electrode which has a planar coil design.

12. The laser device according to claim 1, wherein the excitation means for at last one of the laser gain volumes include at least two radio frequency electrodes extending along a longitudinal axis of the respective laser gain volumes.

13. A method for marking an object with a laser device comprising:
    at least three linear laser gain volumes for a gas to be excited;
    connecting elements for connecting adjacent laser gain volumes, the laser gain volumes being mechanically coupled to each other, and forming a common volumetric space;

excitation means for the laser gain volumes for exciting the gas in the laser gain volumes for generating a laser light;
mirrors arranged in the connecting elements for reflecting laser light between the laser gain volumes;
a totally reflecting rear mirror; and
a partially reflecting output coupler for coupling out a laser beam,
wherein the laser beam is directed to a free central space surrounded by the laser gain volumes.

14. The laser device of claim 1, wherein the adjacent laser gain volumes are mechanically coupled to each other by the connecting elements.

15. The method for marking an object of claim 13, wherein the adjacent laser gain volumes are mechanically coupled to each other by the connecting elements.

* * * * *